(12) United States Patent
Ramakrishnan et al.

(10) Patent No.: US 11,936,511 B2
(45) Date of Patent: Mar. 19, 2024

(54) PAYLOAD TEMPLATE GENERATOR FOR AN INFORMATION HANDLING SYSTEM

(71) Applicant: Dell Products L.P., Round Rock, TX (US)

(72) Inventors: Ramya Ramakrishnan, Bangalore (IN); Sunil Shriram Khannade, Bangalore (IN); Abhirup Seal, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/663,963

(22) Filed: May 18, 2022

(65) Prior Publication Data
US 2023/0379207 A1 Nov. 23, 2023

(51) Int. Cl.
*H04L 41/045* (2022.01)
*H04L 1/00* (2006.01)
*H04L 67/00* (2022.01)

(52) U.S. Cl.
CPC .......... *H04L 41/045* (2022.05); *H04L 1/0084* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 2017/0366636 A1* | 12/2017 | Wang | H04L 67/01 |
| 2018/0307692 A1* | 10/2018 | Yuan | G06F 16/252 |
| 2020/0233699 A1* | 7/2020 | Occhialini | G06F 9/4881 |
| 2022/0092259 A1* | 3/2022 | Chang | G06F 40/166 |
| 2022/0345746 A1* | 10/2022 | Sanchez | H04N 19/188 |
| 2023/0014760 A1* | 1/2023 | Martin | H04W 4/90 |
| 2023/0205751 A1* | 6/2023 | Witte | G06F 16/2282 |
| | | | 707/696 |

* cited by examiner

*Primary Examiner* — Viet D Vu
*Assistant Examiner* — Mohammad Yousuf A. Mian
(74) *Attorney, Agent, or Firm* — Norton Rose Fulbright US LLP

(57) ABSTRACT

In some aspects, an apparatus includes a memory and one or more processors coupled to the memory. The one or more processors are configured to receive, from a client device, a payload template request and to transmit, to the client device based on the payload template request, a payload template response including a plurality of payload templates. The one or more processors are further configured to receive, from the client device, a management request including a payload corresponding to a payload template of the plurality of payload templates and to transmit, to the client device based on the management request, a management response indicating a result associated with the management request.

20 Claims, 7 Drawing Sheets

PAYLOAD TEMPLATE GENERATOR FOR AN INFORMATION HANDLING SYSTEM

FIELD OF THE DISCLOSURE

The instant disclosure relates to information handling systems. More specifically, portions of this disclosure relate to determination of payload templates for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include servers and other devices that may be user-configured (e.g., to change a setting or to perform another operation). For example, a user may configure a target resource (such as a server or other device) via a representational state transfer (REST) application program interface (API) by issuing requests to the REST API. For example, a request may include a uniform resource identifier (URI) of the target resource and may further include a payload that specifies request parameters, such as a type of operation that is requested. The REST API may specify or may be associated with a particular schema or format of the payload, such as a syntax of the payload.

In some cases, forming a valid payload that complies with the particular schema or format may be difficult or time consuming. For example, in some cases, a user may need to access resources, such as documentation, blogposts, whitepapers, or other resources, in order to formulate a valid payload. In addition, for some types of operations, a payload may depend on the target resource, such as a type of target resource or a current setting of the target resource, which may further complicate forming a valid payload for a request.

Further, in cases in which a payload is invalid due to failing to comply with the particular schema or format, an error message may be returned. The error message may indicate that the payload is invalid and may fail to provide details on how the payload should be changed in order to comply with the particular schema or format. In such cases, the user may need to re-access resources to identify how to change the payload, which may be difficult or time consuming. Further, communication of such messages (e.g., communication of requests with invalid payloads and communication of error messages) consumes processing resources and network resources.

SUMMARY

In some aspects of the disclosure, a payload template generator creates payload templates for a client device. For example, the client device may transmit a payload template request to the payload template generator for a particular management operation (such as a POST, PATCH, or PUT operation). Based on the payload template request, the payload template generator may transmit a payload template response to the client device indicating payload templates that comply with a particular schema or format. The client device may select a payload template of the payload templates and may transmit a management request (e.g., to initiate the management operation) including a payload that corresponds to or that is based on the selected payload template. In some examples, the management request may include or correspond to a request to perform a parameter reset operation (e.g., to reset a parameter of a server to a default setting) or a request to replace a certificate stored at a server, as illustrative examples. In another example, the management request may include or correspond to a request to create a volume, such as a virtual disk. In an additional example, the management request may include or correspond to a request to set or modify a network configuration.

In some aspects of the disclosure, a client device may directly initiate generation of the payload templates. For example, the client device may transmit a GET request associated with a representational state transfer (REST) format to a server to request the payload templates. The GET request may indicate the payload template generator (e.g., by specifying a uniform resource identifier (URI) associated with the payload template generator). Alternatively or in addition, the server may indicate the payload template generator to the client device in response to receiving an invalid payload. For example, upon receiving an invalid payload, the server may transmit an error message to the client device indicating the URI of the payload template generator (e.g., to enable the client device to request the payload templates).

To further illustrate, the payload templates may be "customized" for the particular environment, settings, or configuration. For example, creation of a volume (such as a virtual disk) may depend on the available drives and capabilities of a controller, such as a redundant array of independent disks (RAID) controller. In this case, the payload templates may be "customized" based on the available drives and controller capabilities. As another example, updating of a network configuration may depend on network card capabilities and a current configuration of a network controller. In this case, the payload templates may be "customized" based on the network card capabilities and the current configuration of the network controller.

By using a payload template generator to generate payload templates for a client device, time spent accessing resources to form a payload may be reduced or avoided. Further, an amount of messages transmitted between a server and a client device may be reduced (e.g., by reducing or avoiding transmission of requests with invalid payloads and by reducing or avoiding transmission of error messages based on the invalid payloads).

In addition, by determining payload templates internally to a server or other resource that is to be managed or reconfigured (e.g., within a trust boundary associated with the resource), accuracy of the payload templates may be increased. For example, by determining payload templates internally to the server or other resource, the payload templates may reflect a current state of the server or other resource (such as a current configuration, capability, or setting), where such information may not be available to a third party. As a result, accuracy of the payload templates may be increased as compared to determining a payload using external or third-party resources.

Further, in some aspects, the payload template generator may "borrow" or "repurpose" logic that is used to process management requests. To illustrate, an interface used for management requests (such as a REST application program interface (API)) may include logic (e.g., instructions, hardware, or a combination thereof) that validates payloads to verify that the payloads comply with a particular schema or format. In some aspects of the disclosure, such logic may also be used by the template generator to determine, for a particular management request, a set of payloads for the management request that comply with the particular schema or format. As a result, in some examples, complexity and cost associated with a template generator may be reduced (e.g., by "borrowing" or "repurposing" logic associated with a REST API).

In some aspects, an apparatus includes a memory and one or more processors coupled to the memory. The one or more processors are configured to receive, from a client device, a payload template request and to transmit, to the client device based on the payload template request, a payload template response including a plurality of payload templates. The one or more processors are further configured to receive, from the client device, a management request including a payload corresponding to a payload template of the plurality of payload templates and to transmit, to the client device based on the management request, a management response indicating a result associated with the management request.

In some other aspects, a method includes receiving, from a client device, a payload template request and transmitting, to the client device based on the payload template request, a payload template response including a plurality of payload templates. The method further includes receiving, from the client device, a management request including a payload corresponding to a payload template of the plurality of payload templates and transmitting, to the client device based on the management request, a management response indicating a result associated with the management request.

In some other aspects, an information handling system includes a memory and a processor coupled to the memory. The processor is configured to transmit, to a server, a payload template request and to receive, from the server based on the payload template request, a payload template response including a plurality of payload templates. The processor is further configured to transmit, to the server, a management request including a payload corresponding to a payload template of the plurality of payload templates and to receive, from the server based on the management request, a management response indicating a result associated with the management request.

Some examples herein may be implemented using an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
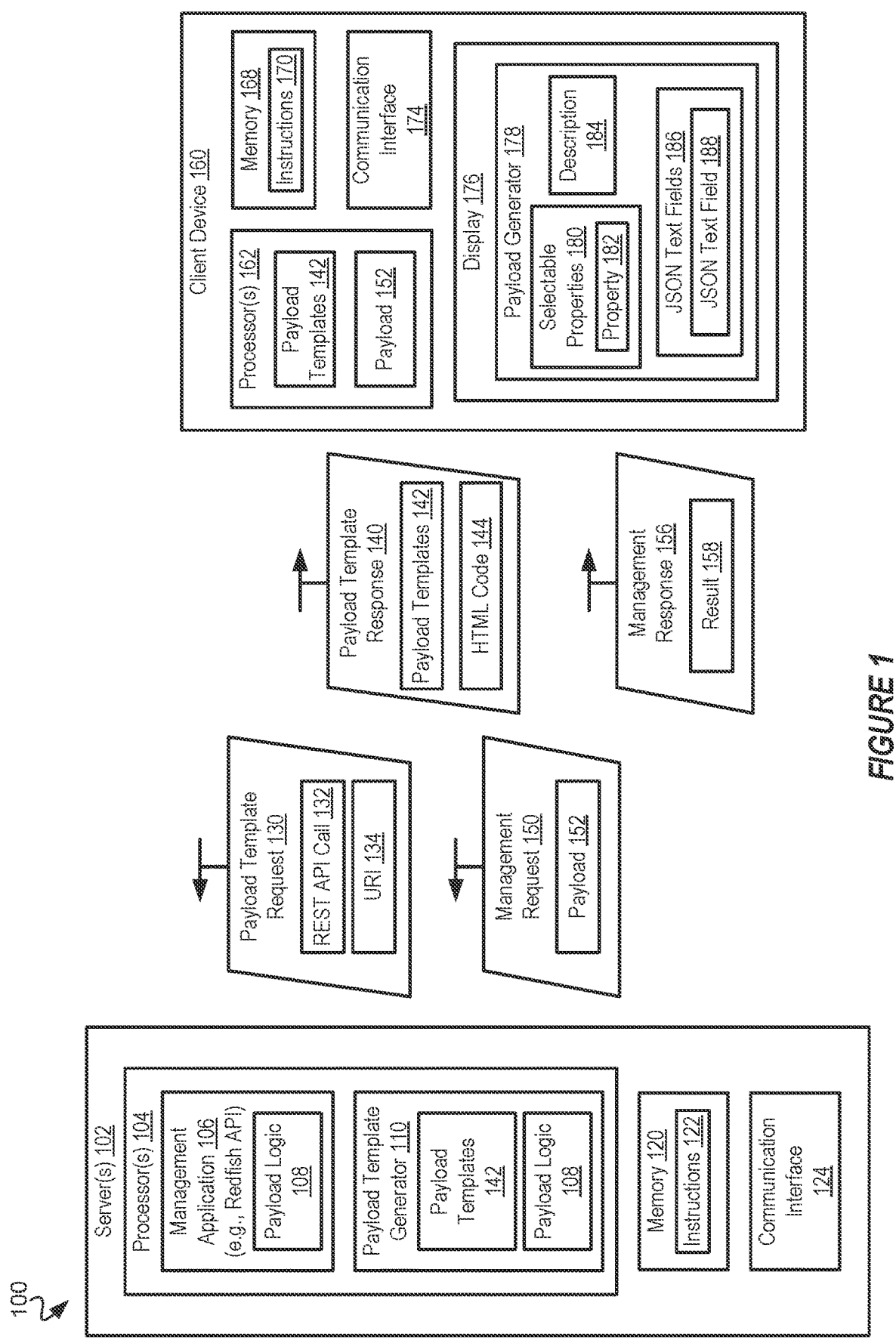
FIG. 1 is a block diagram illustrating an example of a system according to some aspects of the disclosure.

FIG. 1 is a block diagram illustrating an example of a system 100 according to some aspects of the disclosure. The system 100 may include one or more servers 102 and a client device 160. In some implementations, the client device 160 may include or correspond to a desktop computer, a laptop computer, a tablet, a mobile device, a server, or another type of computing device, as illustrative examples.

The one or more servers 102 may include one or more processors 104, a memory 120 coupled to the one or more processors 104, and a communication interface 124 coupled to the one or more processors 104. In some implementations, the memory 120 may store instructions 122 executable by the one or more processors 104 to initiate, perform, or control one or more operations described herein.

The client device 160 may include one or more processors 162, a memory 168 coupled to the one or more processors 162, and a communication interface 174 coupled to the one or more processors 162. In some implementations, the memory 168 may store instructions 170 executable by the one or more processors 162 to initiate, perform, or control one or more operations described herein. In some implementations, the client device 160 may include a display 176 coupled to the one or more processors 162.

During operation, the client device 160 may communicate with the one or more servers 102 (e.g., via the communication interfaces 124, 174). In some implementations, the client device 160 and the one or more servers 102 may communicate using one or more networks, such as one or more of a local area network (LAN), a wide area network (WAN), a wired network, a wireless network, or the Internet, as illustrative examples.

In some examples, the client device 160 may initiate management operations at the one or more servers 102, such as to modify or reset a setting or configuration associated with a target resource, to replace a certificate associated with a target resource, to create a virtual device (such as a virtual disk) at the target resource, or to reboot the target resource. Depending on the particular example, the target resource may include or correspond to a server, a network, a storage device, a virtual device, or another component, as illustrative examples.

To enable the client device 160 to initiate management operations, the one or more servers 102 may execute a management application 106. To illustrate, the management application 106 may include an application program interface (API). In some examples, the API may provide a representational state transfer (REST) interface over hypertext transfer protocol (HTTP) using a JavaScript Object Notation (JSON) format. In some other examples, the API may use another format, such as an Extensible Markup Language (XML) format. In some examples, the management application 106 may include or correspond to a Redfish API.

Some APIs may specify that a management request is to include a payload. The payload may include or correspond to a body of the management request and may have a particular format, such as one or more of a REST format, an HTTP format, or a JSON format. In some cases, forming a payload that complies with the API and the particular format may be time consuming. As a result, an amount of downtime may increase (e.g., where an invalid payload delays modification or resetting of a setting or configuration associated with a target resource, replacing a certificate associated with a target resource, creating a virtual device, or rebooting the target resource).

In some aspects of the disclosure, the one or more servers 102 may execute or may access a payload template generator 110 to generate payload templates for one or more client devices, such as the client device 160. To illustrate, the client device 160 may transmit (e.g., via the communication interface 174) a payload template request 130. The payload template request 130 may have a REST format and may correspond to a GET request associated with the REST format.

In some examples, the payload template request 130 specifies a REST API call 132 to the management application 106. In some examples, the REST API call 132 (or another field of the payload template request 130) specifies one or more parameters of a management operation to be performed (and for which a payload is to be generated). For example, the one or more parameters may indicate a type of management operation, such as a reset-to-defaults operation (e.g., as described further with reference to FIG. 4) or a certificate service replacement operation (e.g., as described further with reference to FIG. 5), as illustrative examples. In some other examples, the payload template request 130 may correspond to another type of request, such as a request to create a virtual device (such as a virtual disk) or to set or update a network configuration.

The payload template request 130 may specify a target resource, such as via a uniform resource identifier (URI) 134 of the target resource or via another indicator. In some examples, the URI 134 indicates the payload template generator 110 or another target resource.

To further illustrate, in some examples, the payload template request 130 may have the format illustrated in Example 1:

/Templates?uri='<target uri>'&format='<html/json>'

Example 1

In Example 1, "uri" may specify the URI path for which payload templates are to be generated. Further, a "format" field of the payload template request 130 may indicate a particular format for the payload templates, such as a hypertext markup language (HTML) format or a JSON format. In some examples, if the "format" field is omitted from the payload template request 130, the payload templates may be provided in a default format (e.g., a JSON format or another format).

Example 2 illustrates a particular example of the format of Example 1. In Example 2, the type of management operation indicated by the payload template request 130 may correspond to a reset-to-defaults operation. Other implementations are also within the scope of the disclosure.

/Templates?uri='/redfish/v1/Managers/1/Actions/Manager.ResetToDefaults'

Example 2

The one or more servers 102 may receive the payload template request 130 from the client device 160. For example, the communication interface 124 may receive the payload template request 130. The one or more servers 102 may input the payload template request 130 (or the REST API call 132) to the management application 106. The management application 106 may transmit a request to the payload template generator 110 based on the payload template request 130 (or based on the REST API call 132). The payload template generator 110 may identify, based on the request, one or more payload templates (such as payload templates 142) that are associated with a target resource, such as the target resource specified by the URI 134. The payload template generator 110 may transmit, based on the request, the payload templates 142 to the management application 106, and the management application 106 may receive the payload templates 142 from the payload template generator 110 based on the request. The payload templates 142 may correspond to REST payloads that comply with a REST format.

The payload template generator 110 may determine the payload templates 142 based on one or more criteria. In some examples, the payload template generator 110 may determine the payload templates 142 based on one or more dynamically determined current properties (e.g., properties determined at runtime) associated with a target resource (e.g., a server, network, storage device, or other component).

The payload template generator 110 may provide the payload templates 142 to the management application 106. The management application 106 may initiate transmission (e.g., via the communication interface 124) of a payload template response 140 to the client device 160 based on the payload template request 130. The payload template response 140 may include the payload templates 142. In some examples, the payload template response 140 may include code indicating a payload generator 178 to enable selection among the payload templates 142. In some examples, the code may include or correspond to hypertext markup language (HTML) code 144 executable by the client device 160 to generate the payload generator 178. In some examples, the display 176 may present the payload generator 178, such as via a graphical user interface (GUI).

To further illustrate, in some implementations, the payload template response 140 may include code corresponding to the illustrative pseudocode of Example 3. Other implementations are also within the scope of the disclosure.

```
{
    "Templates":
    [
        {
            "ResetType": "ResetAll"
        },
        {
            "ResetType": "PreserveNetworkAndUsers"
        }
    ],
    "Target": "/redfish/v1/Managers/1/Actions/Manager.ResetToDefaults"
    "HTMLPayloadGenerator": "/Templates?uri='
/redfish/v1/Managers/1/Actions/Manager.ResetToDefaults'&format=html"
}
```

Example 3

In Example 3, the payload template response 140 may include two payload templates 142 (corresponding to "ResetType": "ResetAll" and "ResetType": "PreserveNetworkAndUsers"). In other examples, the payload template response 140 may include a different number of payload templates 142, a different type of payload templates 142, or a combination thereof.

In some other examples, the payload templates 142 may include payload templates for creating a virtual device, such as a virtual disk (e.g., a virtual disk in a RAID system). In such examples, the payload templates 142 may be based on the particular available drives and RAID controller capabilities. In some additional examples, the payload templates 142 may include payload templates for performing a network configuration operation and may be based on the particular network card capabilities and the current configuration of a network controller. Other examples are also within the scope of the disclosure.

The client device 160 may receive the payload template response 140. The client device 160 may select at least one payload of the payload templates 142. For example, the client device 160 may receive user input indicating selection of a payload template of the payload templates 142. In some examples, the client device 160 may modify one or more features of the payload template to generate a payload 152 corresponding to or based on the payload template (e.g., by entering or completing a field of the payload template). For example, a field of the payload template may be "empty" or "blank" until supplied by a user (e.g., by entering a value). In such examples, the payload 152 may differ from the payload template in one or more respects. In some other examples, the payload 152 may be the same as the payload template.

To illustrate, in some implementations, the client device 160 may execute the HTML, code 144 to enable selection among the payload templates 142 (e.g., to select a payload template from the payload templates 142), to enable generation of the payload 152 based on selection of the payload template, or a combination thereof. For example, the HTML code 144 may indicate selectable properties 180 for the payload 152 that are selectable via the payload generator 178. As another example, the HTML code 144 may specify a description 184 of the selectable properties 180 that is to be indicated via the payload generator 178. As an additional example, the HTML code 144 may indicate JavaScript Object Notation (JSON) text fields 186 that correspond to the payload templates 142 and that are indicated via the payload generator 178.

The client device 160 may transmit (e.g., via the communication interface 174) a management request 150 based on the payload template response 140. For example, the payload template response 140 may indicate the payload 152 (e.g., after selection of the payload 152 via the payload generator 178). To illustrate, the payload 152 may be based on a selected property 182 of the selectable properties 180. As another example, the payload 152 may be selected based at least in part on the description 184. As an additional example, the payload 152 may be selected based on a JSON text field 188 associated with the payload 152 (e.g., by copying the JSON text field 188 from the payload generator 178 to a field of the management request 150). The JSON text fields 186 may include the JSON text field 188.

The one or more servers 102 may receive the management request 150 from the client device 160. The one or more servers 102 may perform one or more operations based on the management request 150 (e.g., by performing one or more operations indicated by the payload 152).

As referred to herein, "management" (such as in a "management" request or a "management" operation) may refer to an operation initiated or performed by one or more servers in response to a request from a client device to determine, set, reconfigure, adjust, or modify one or more parameters of a target resource, where the target resource may be included in the one or more servers or may be external to the one or more servers. For example, the management request 150 may be for management of a target resource (e.g., a server, network, storage device, or other component that is included in or coupled to the one or more servers 102), such as to modify or reset a setting or configuration associated with the target resource, to replace a certificate associated with a target resource, or to reboot the target resource.

After performing the management operation based on the management request 150, the one or more servers 102 may transmit a management response 156 to the client device 160. The management response 156 may indicate a result 158 of the management operation. For example, the result 158 may indicate one of success of the management operation or failure of the management operation.

In some implementations, the management application 106 and the payload template generator 110 may each include or may each access payload logic 108. To illustrate, the management application 106 may use the payload logic 108 to analyze and validate payloads, such as the payload 152. For example, upon receiving the management request 150, the management application 106 may use the payload logic 108 to validate that the payload 152 complies with a particular format or schema (e.g., a Redfish schema), to perform one or more other operations based on the payload 152, or a combination thereof. In some aspects, the payload template generator 110 may use the payload logic 108 to determine, based on the payload template request 130, the payload templates 142 for the management request 150.

In some aspects, the client device 160 may use an API to communicate with the payload template generator 110. In some implementations, the API may be exposed in the management application 106 to the client device 160 for one or more of the following: as part of an ActionInfo response for actions; as ExtendedInfo in resource collection responses for POST create operations; as ExtendedInfo in resource instance responses for PATCH or PUT operations; or as part of responses to HTTP requests with invalid payloads.

One or more features described herein may improve performance associated with a system. For example, by using the payload template generator 110 to generate the payload templates 142 for the client device 160, time spent accessing resources to form a payload (such as the payload 152) may be reduced or avoided. Further, an amount of messages transmitted between the one or more servers 102 and the client device 160 may be reduced (e.g., by reducing or avoiding transmission of requests with invalid payloads and by reducing or avoiding transmission of error messages based on the invalid payloads).

In addition, by determining payload templates internally to a resource that is to be managed or reconfigured (e.g., within a trust boundary associated with the resource), accuracy of the payload templates 142 may be increased. For example, by determining the payload templates 142 internally to the one or more servers 102, the payload templates 142 may reflect a current state of the one or more servers 102 (such as a current configuration, capability, or setting), where such information may not be available to third parties. As a result, accuracy of the payload templates 142 may be increased as compared to determining a payload using external or third-party resources.

Further, in some aspects, complexity and cost may be reduced by "borrowing" or "repurposing" the logic that is used to process management requests. To illustrate, in addition to the management application 106 using the payload logic 108 to analyze and process received payloads, the payload template generator 110 may use the payload logic 108 to determine, for a particular management request, a set of payloads for the management request that comply with the particular schema or format (e.g., by determining, based on the payload template request 130, the payload templates 142 for the management request 150). As a result, in some examples, complexity and cost may be reduced.

Figure 2:
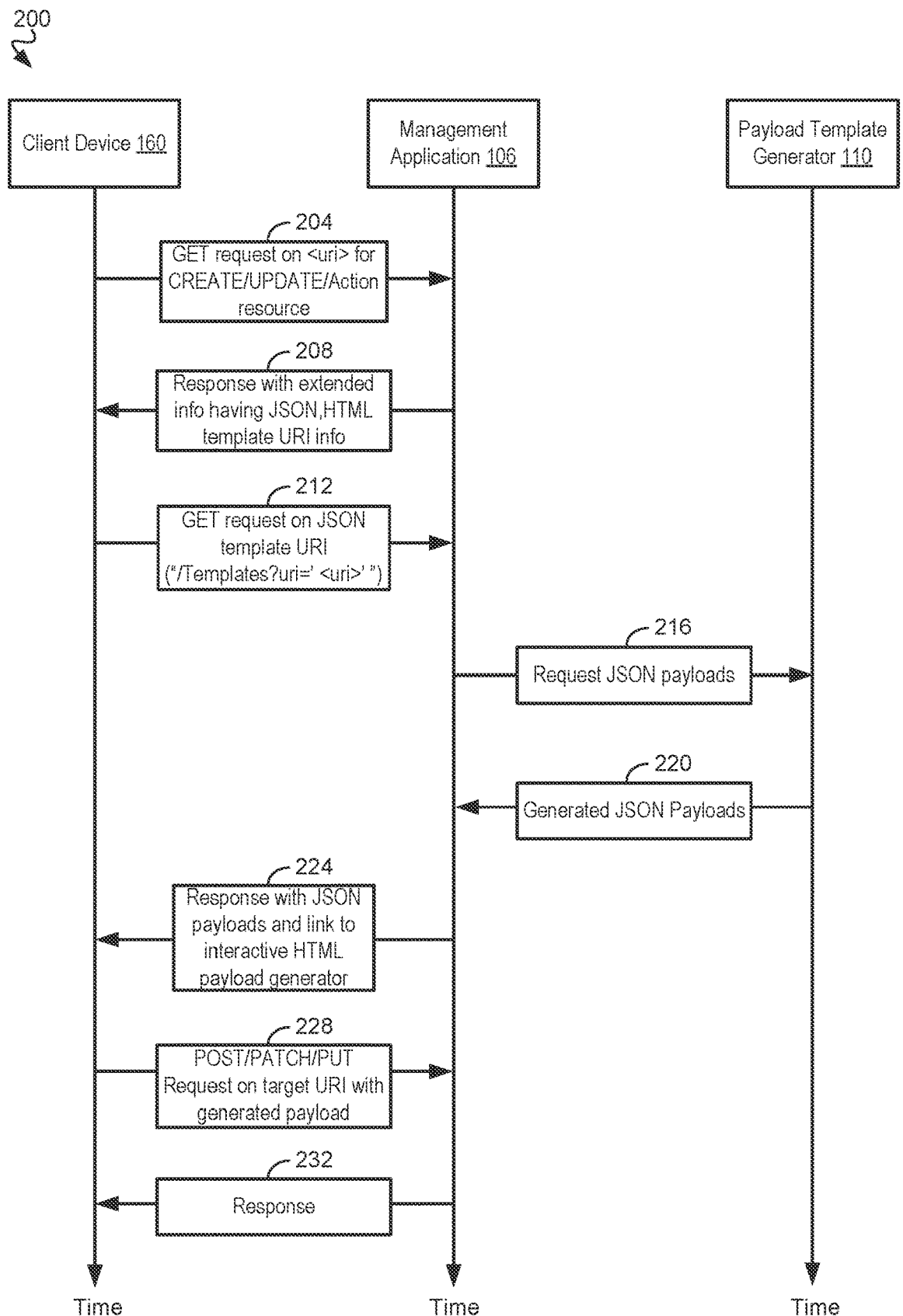
FIG. 2 illustrates examples of operations that may be performed by the system of FIG. 1 according to some aspects of the disclosure.

FIG. 2 illustrates examples of operations 200 that may be performed by the system 100 of FIG. 1 according to some aspects of the disclosure. It is noted that the examples of FIG. 2 are illustrative and that other examples are also within the scope of the disclosure.

The operations 200 may include transmitting, by the client device 160, a GET request associated with a target resource (<uri>), at 204. The GET request may include or may correspond to a REST API call to the management application 106. The GET request may indicate a request to create, update, or perform another action related to the target resource. The management application 106 may receive the GET request.

The operations 200 may further include transmitting, to the client device 160 based on the target resource, a response to the GET request indicating a URI of a payload template generator, at 208. The client device 160 may receive the response from the management application 106. The response may include extended information (info) having JSON and HTML template URI information. In some examples, the extended info may correspond to or may have the format of the pseudocode depicted in Example 4:

```
{
"Helper001":
{
"Description": "This message will expose the template helper Uris for the applicable HTTP
method on the instance or the action represented by the ActionInfo.",
"Message": "For sample %1 payloads, perform GET on %2 for JSON templates or on %3
for the interactive HTML payload generator",
"MessageSeverity": "Informational",
"NumberOfArgs": 3,
"ParamTypes": [
"string", -- > POST_CREATE,POST_ACTION,PATCH,PUT
"string",    -->    SAMPLE    JSON    Templates,for    e.g:
"/Templates?uri='/redfish/v1/Managers/1/Actions/Manager.Reset'"
"string"    -->    Interactive    HTML    payload    generator,for    e.g:
"/Templates?uri='/redfish/v1/Managers/1/Actions/Manager.Reset'&templatetype=html"
],
"Resolution": "None"
}
}
```

Example 4

The operations 200 may further include transmitting, by the client device 160, a GET request indicating the JSON template URI, at 212. In some examples, the GET request corresponds to the payload template request 130 of FIG. 1, and the JSON template URI corresponds to the URI 134 of FIG. 1. In some examples, the JSON template URI indicates the payload template generator 110. The management application 106 may receive the GET request.

The operations 200 may further include transmitting a request for JSON payloads to the payload template generator 110 based on the GET request, at 216. The operations 200 may further include receiving generated JSON payloads from the payload template generator 110, at 220. In some examples, the generated JSON payloads may include or correspond to the payload templates 142 of FIG. 1.

The operations 200 may further include transmitting, by the management application 106, a response with the JSON payloads and a link to an interactive HTML payload generator, at 224. In some examples, the HTML code 144 of FIG. 1 is executable to present the interactive HTML payload generator (e.g., via the payload generator 178). The client device 160 may receive the response from the management application 106.

The operations 200 may further include transmitting, by the client device 228, a one of a POST, PATCH, or PUT request on a target URI with a payload selected from or generated based on the JSON payloads, at 228. In some examples, the management request 150 of FIG. 1 includes or corresponds to the POST, PATCH, or PUT request. The management application 106 may receive the POST, PATCH, or PUT request.

The operations 200 may further include transmitting a response to the POST, PATCH, or PUT request, at 232. In some examples, the response may correspond to or include the management response 156 of FIG. 1. The client device 160 may receive the response.

Figure 3:
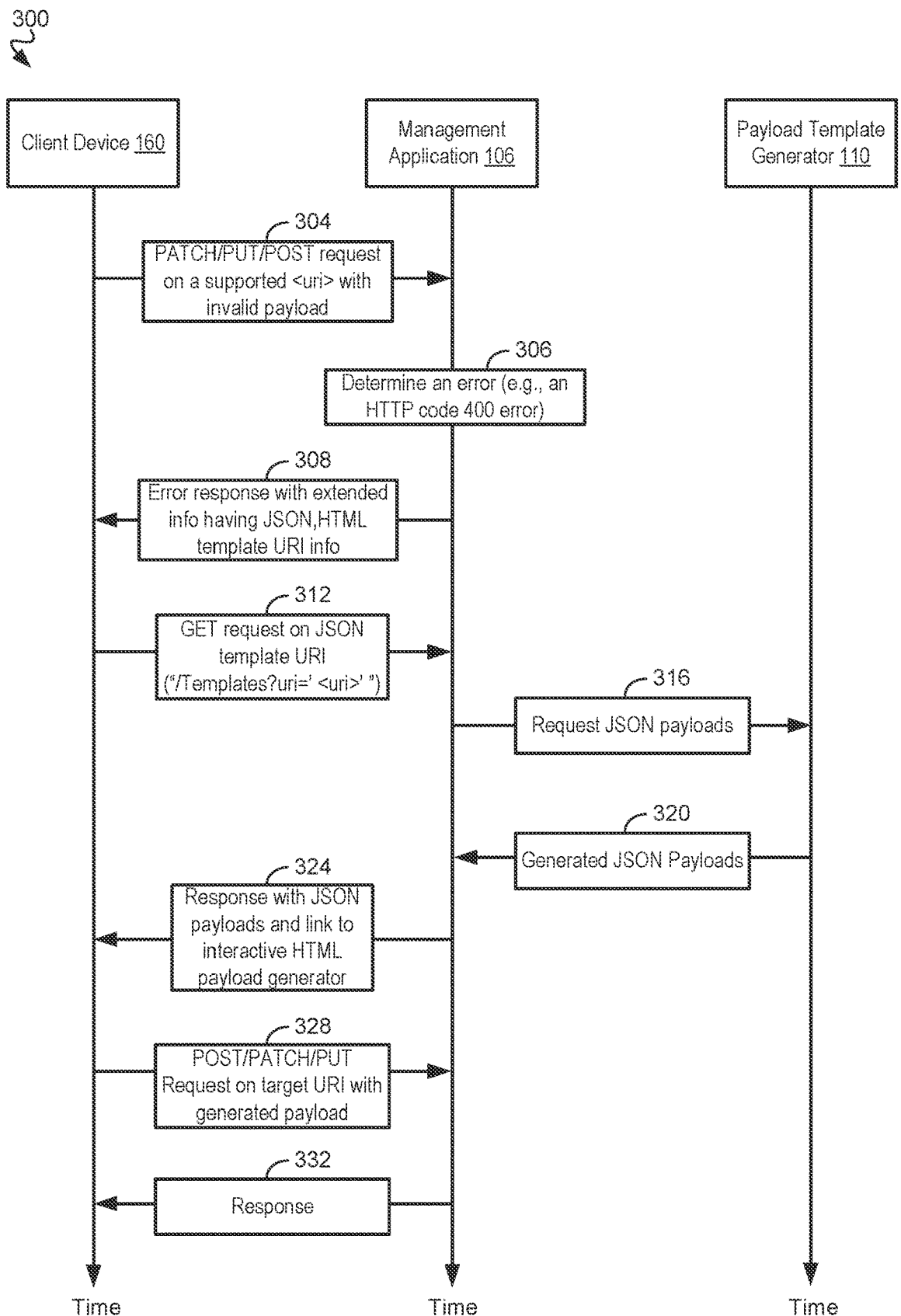
FIG. 3 illustrates examples of operations that may be performed by the system of FIG. 1 according to some aspects of the disclosure.

FIG. 3 illustrates examples of operations 300 that may be performed by the system 100 of FIG. 1 according to some aspects of the disclosure. It is noted that the examples of FIG. 3 are illustrative and that other examples are also within the scope of the disclosure.

The operations 300 may include transmitting, by the client device a request associated with a target resource (<uri>), at 304. The request may include an invalid payload (e.g., an incorrectly formed payload, such as a payload having one or more of a semantic error or a syntactic error). The request may correspond to one of a PATCH request, a PUT request, or a POST request. The management application 106 may receive the request.

The operations 300 may include determining an error associated with the request, at 306. For example, the management application 106 may input the payload of the request to the payload logic 108. The management application 106 may use the payload logic 108 to identify that the payload is invalid and to determine the error associated with the request. In some examples, the error may correspond to a hypertext transfer protocol (HTTP) code 400 error.

The operations 300 may further include transmitting, to the client device 160 based on the invalid payload, an error response that includes a URI of a payload template generator, at 308. For example, the error response may include a URI of the payload template generator 110. In some examples, the error response indicates an error code, such as HTTP code 400. The error response may include extended information (info) having JSON and HTML template URI information. In some examples, the error response may have a format corresponding to the format depicted above in Example 4.

The operations 300 may further include transmitting, by the client device 160, a GET request indicating the JSON template URI, at 312. In some examples, the GET request corresponds to the payload template request 130 of FIG. 1, and the JSON template URI corresponds to the URI 134 of FIG. 1. In some examples, the JSON template URI indicates the payload template generator 110. The management application 106 may receive the GET request.

The operations 300 may further include transmitting a request for JSON payloads to the payload template generator 110 based on the GET request, at 316. The operations 300 may further include receiving generated JSON payloads from the payload template generator 110, at 320. In some examples, the generated JSON payloads may include or correspond to the payload templates 142 of FIG. 1.

The operations 300 may further include transmitting, by the management application 106, a response with the JSON payloads and a link to an interactive HTML payload generator, at 324. In some examples, the HTML code 144 of FIG. 1 is executable to present the interactive HTML payload generator (e.g., via the payload generator 178). The client device 160 may receive the response from the management application 106.

The operations 300 may further include transmitting, by the client device 328, a one of a POST, PATCH, or PUT request on a target URI with a payload selected from or generated based on the JSON payloads, at 328. In some examples, the management request 150 of FIG. 1 includes or corresponds to the POST, PATCH, or PUT request. The management application 106 may receive the POST, PATCH, or PUT request.

The operations 300 may further include transmitting a response to the POST, PATCH, or PUT request, at 332. In some examples, the response may correspond to or include the management response 156 of FIG. 1. The client device 160 may receive the response.

Figure 4:
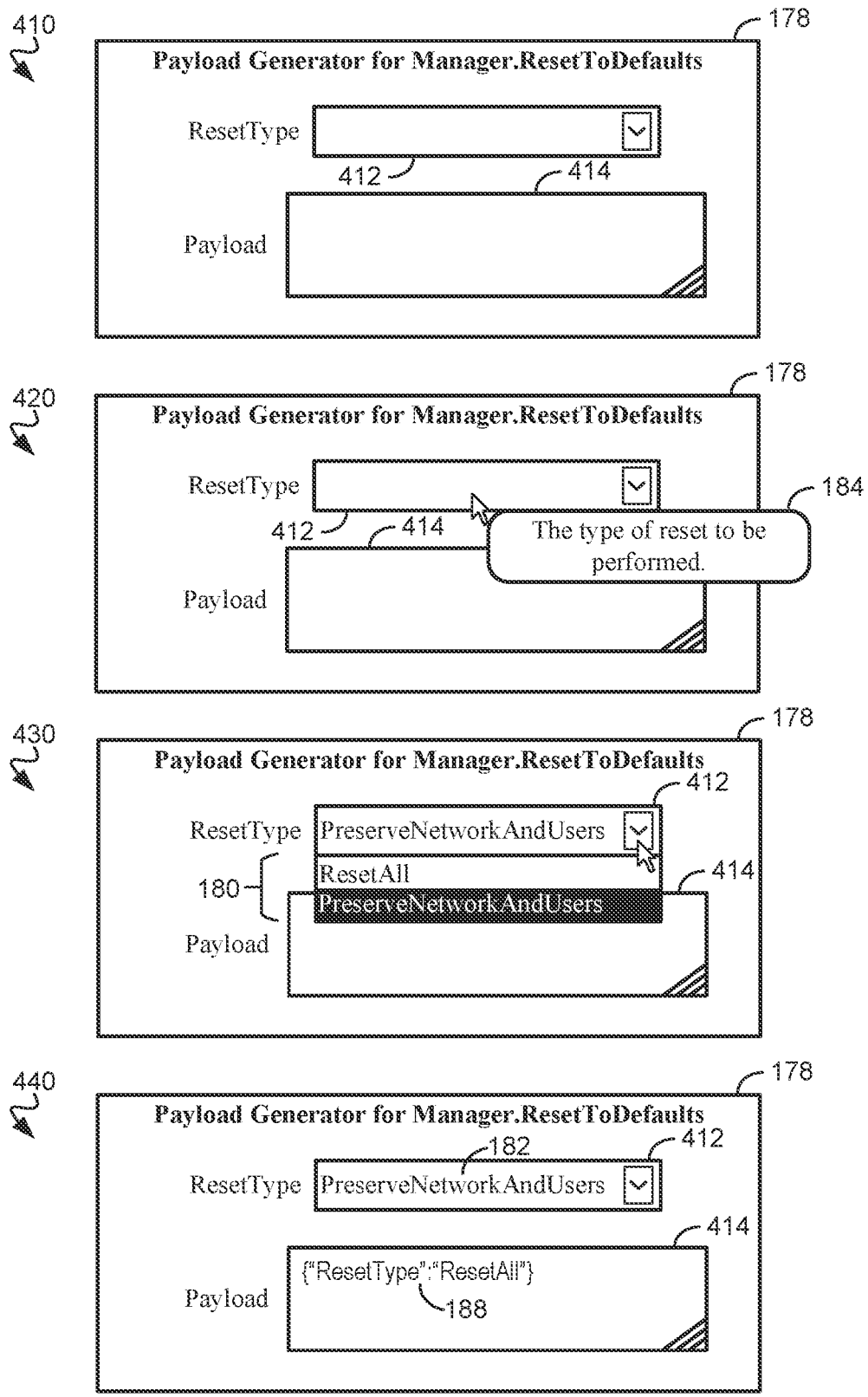
FIG. 4 illustrates examples of operations that may be associated with a payload generator according to some aspects of the disclosure.

FIG. 4 illustrates examples of operations that may be associated with the payload generator 178 according to some aspects of the disclosure. The example of FIG. 4 may correspond to request for the one or more servers 102 to reset one or more settings to a default setting, such as described above with reference to Example 2. In such examples, the management request 150 of FIG. 1 may include or correspond to a request to reset one or more settings to a default setting. Other examples are also within the scope of the disclosure.

At 410, the payload generator 178 indicates a drop-down menu 412 and a payload field 414. As illustrated at 420, a user may hover over (or mouse over) the drop-down menu 412 to cause the payload generator 178 to display the description 184 of the selectable properties 180 (e.g., via a pop-up or overlay message). At 430, a user may select the drop-down menu 412 (e.g., by clicking the drop-down menu 412) to view the selectable properties 180.

At 440, after selecting the property 182 from among the selectable properties 180, the payload field 414 may display the JSON text field 188 of the of the payload 152. The JSON text field 188 may enable user may copy and paste the JSON text field 188. In some other examples, selection of another property of the selectable properties 180 may populate the payload field 414 with another payload corresponding to another payload template of the payload templates 142.

Figure 5:
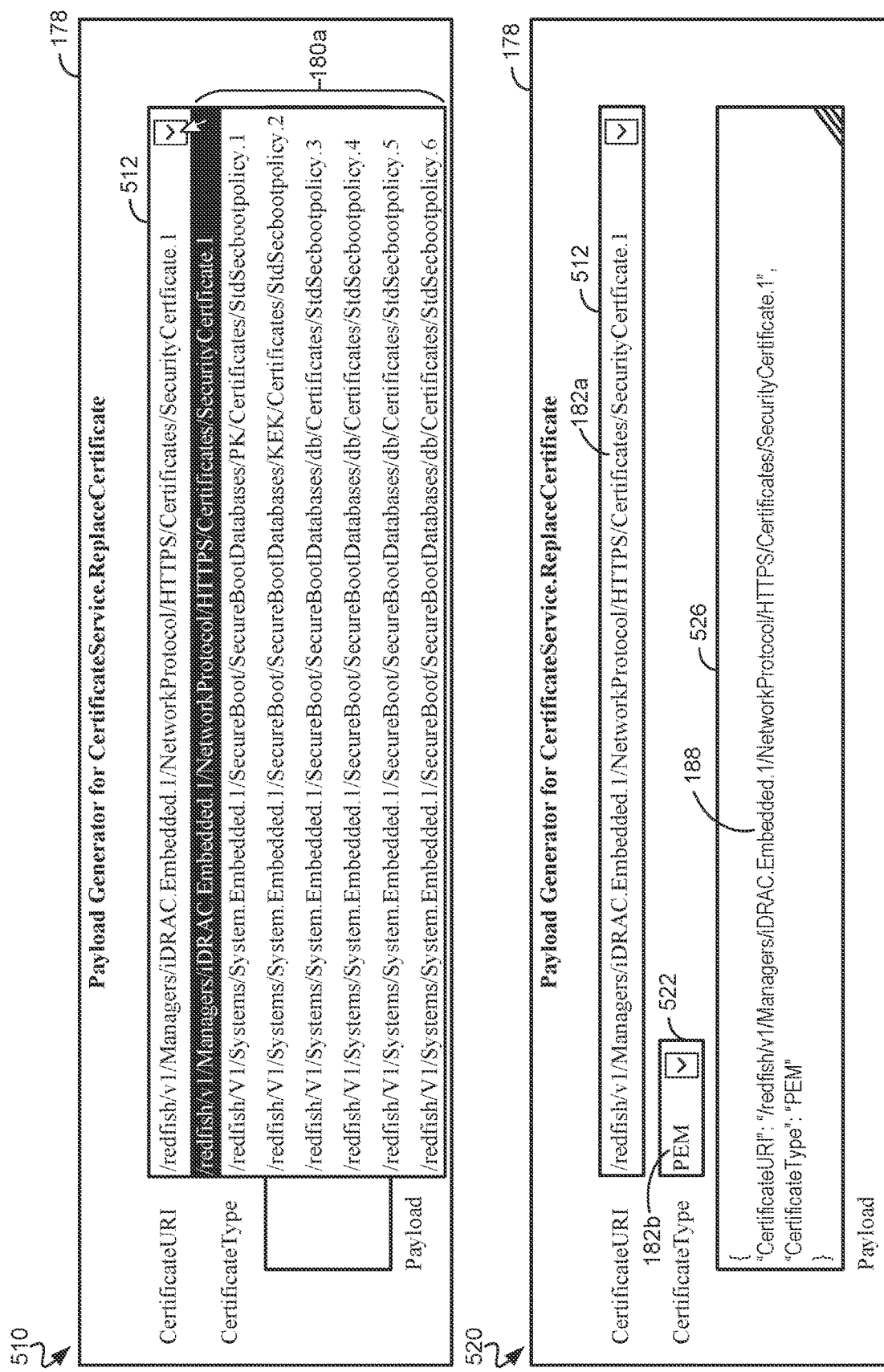
FIG. 5 illustrates examples of operations that may be associated with a payload generator according to some aspects of the disclosure.

FIG. 5 illustrates examples of operations that may be associated with the payload generator 178 according to some aspects of the disclosure. The example of FIG. 5 may correspond to request for the one or more servers 102 to perform a certificate service, such as by replacing a certificate. In such examples, the management request 150 of FIG. 1 may include or correspond to a request to perform a certificate service, such as by replacing a certificate. Other examples are also within the scope of the disclosure.

At 510, the payload generator 178 indicates a drop-down menu 512. A user may select the drop-down menu 512 (e.g., by clicking on the drop-down menu 512) to view selectable properties 180a that may be included in the selectable properties 180 of FIG. 1. In the example of FIG. 5, the selectable properties 180a may correspond to certificate URIs of a certificate to be serviced or replaced.

At shown at 520, a user may select, via the drop-down menu 512, a property 182a of the selectable properties 180a. FIG. 5 also illustrates that a user may select, via a drop-down menu 522, a property 182b (e.g., a certificate type of a certificate to be serviced or replaced, such as a privacy enhanced mail (PEM) certificate type or another certificate type). In some examples, the PEM certificate type may be selected from among other multiple certificate types, such as one or more of a PEM chain certificate type or a Public-Key Cryptography Standards (PKCS) type 7 (PKCS7) certificate type, as illustrative examples.

In some implementations, a user may hover over (or mouse over) the drop-down menus 512, 522 to cause the payload generator 178 to display a description of the selectable properties 180a, 180b, respectively (e.g., via a pop-up or overlay message). For example, a user may hover over the drop-down menus 512, 522 to cause the payload generator 178 to generate descriptions of "The link to the certificate that is to be replaced" and "The format of the certificate to be replaced," respectively.

Based on selection of the properties 182a, 182b, a payload menu 526 may indicate the JSON text field 188 (e.g., to enable a user to copy and paste the JSON text field 188). Accordingly, the example of FIG. 5 illustrates that the payload generator 178 may indicate multiple selectable properties (such as certificate URI and certificate type) that may be used to generate a payload corresponding to the JSON text field 188. In some examples, the multiple selectable parameters are provided via multiple drop-down menus of the payload generator 178, as illustrated in the example of FIG. 5.

Figure 6:
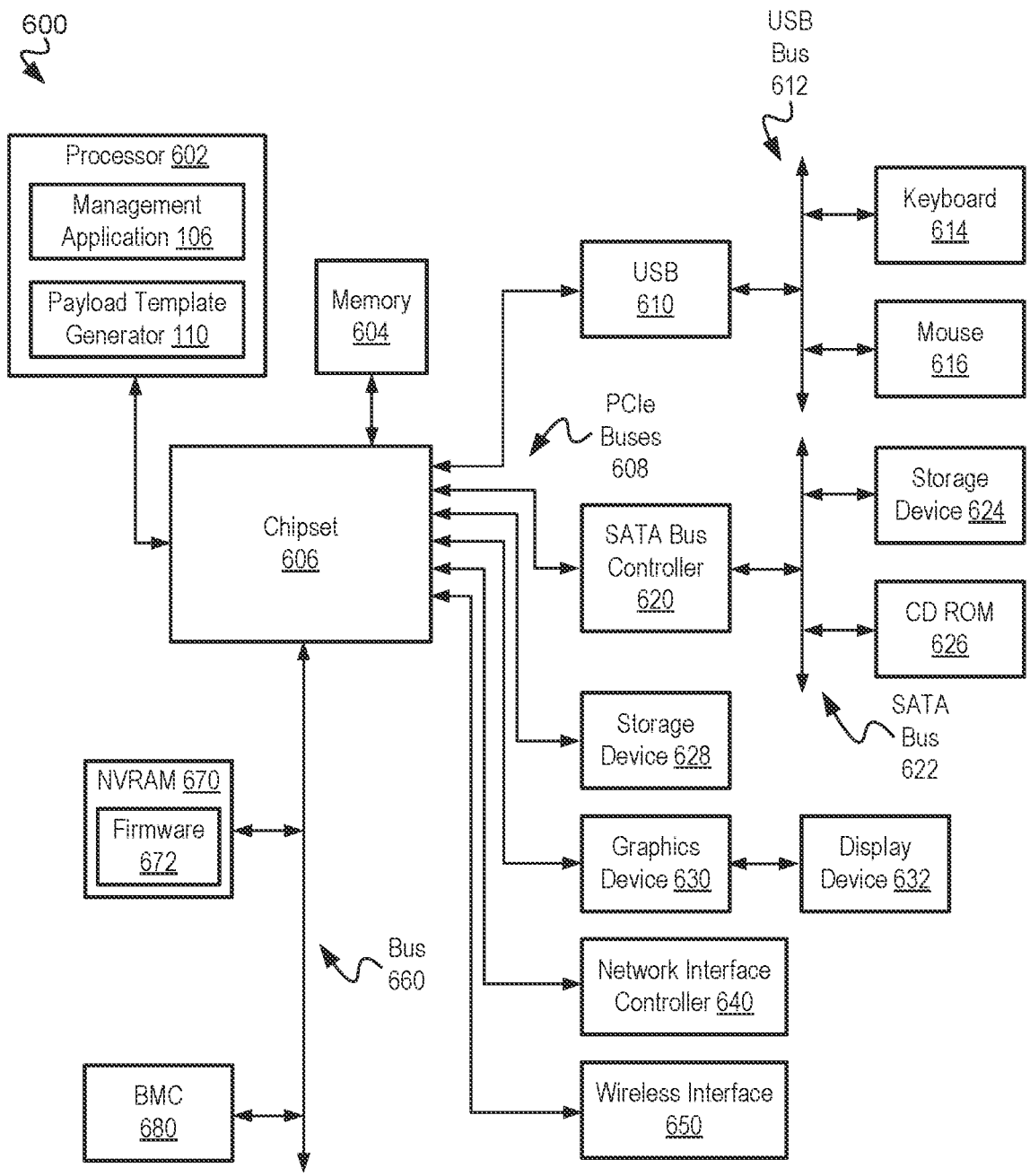
FIG. 6 is a schematic block diagram of an example information handling system according to some aspects of the disclosure.

FIG. 6 depicts an illustrative example of an information handling system 600 according to some aspects of the disclosure. In some examples, one or more features of the information handling system 600 may be implemented at the one or more servers 102 of FIG. 1. Alternatively or in addition, in some examples, one or more features of the information handling system 600 may be implemented at the client device 160 of FIG. 1.

Information handling system 600 may include a processor 602 (e.g., a central processing unit (CPU)), a memory 604 (e.g., a dynamic random-access memory (DRAM)), and a chipset 606. In some examples, one or more of the processor 602, the memory 604, or the chipset 606 may be included on a motherboard (also referred to as a mainboard), which may include a printed circuit board (PCB) with embedded conductors organized as transmission lines between any of the processor 602, the memory 604, the chipset 606, or other components of the information handling system 600. The components may be coupled to the motherboard through packaging connections such as a pin grid array (PGA), ball grid array (BGA), land grid array (LGA), surface-mount technology, and/or through-hole technology. In some embodiments, one or more of the processor 602, the memory 604, the chipset 606, or other components may be organized as a system on chip (SoC).

The processor 602 may execute program code by accessing instructions loaded into memory 604 from a storage device, may execute the instructions to operate on data also loaded into memory 604 from a storage device, and may generate output data that is stored to memory 604 or sent to another component. The processor 602 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 602 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 606 may facilitate the transfer of data between the processor 602, the memory 604, and other components. In some embodiments, chipset 606 may include two or more integrated circuits (ICs), such as a northbridge controller coupled to the processor 602, the memory 604, and a southbridge controller, with the southbridge controller coupled to the other components such as universal serial bus (USB) controller 610, a SATA bus controller 620, and PCIe buses 608. The chipset 606 may couple to other components through one or more PCIe buses 608.

Some components may be coupled to one bus line of the PCIe buses 608, whereas some components may be coupled to more than one bus line of the PCIe buses 608. One example component is the USB controller 610, which may interface the chipset 606 to a USB bus 612. The USB bus 612 may couple input/output components, such as a keyboard 614 and a mouse 616, and also other components, such as USB flash drives, or another information handling system. Another example component is the SATA bus controller 620, which may couple the chipset 606 to a SATA bus 622. The SATA bus 622 may facilitate efficient transfer of data between the chipset 606 and components coupled to the chipset 606 and a storage device 624 (e.g., a hard disk drive (HDD) or solid-state disk drive (SDD)) and/or a compact disc read-only memory (CD-ROM) 626. The PCIe buses 608 may also couple the chipset 606 directly to a storage device 628 (e.g., a solid-state disk drive (SDD)). A further example of an example component is a graphics device 630 (e.g., a graphics processing unit (GPU)) for generating output to a display device 632, a network interface controller (NIC) 640, and/or a wireless interface 650 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example, chipset 606 may be directly connected to an individual end point via a PCIe root port within the chipset and a point-to-point topology as shown in FIG. 6.

The chipset 606 may also be coupled to a bus 660, which may couple the chipset 606 to one or more system management components. For example, a non-volatile random-access memory (NVRAM) 670 storing firmware 672 may be coupled to the bus 660. As another example, a controller, such as a baseboard management controller (BMC) 680, may be coupled to the chipset 606 through the bus 660. BMC 680 may be referred to as a service processor or embedded controller (EC). Capabilities and functions provided by BMC 680 may vary based on the type of information handling system. For example, the term baseboard management system may be used to describe an embedded processor included at a server, while an embedded controller may be found in a consumer-level device. As disclosed herein, BMC 680 may represent a processing device different from processor 602, which provides various management functions for information handling system 600. For example, an embedded controller may be responsible for power management, cooling management, and the like. An embedded controller included at a data storage system may be referred to as a storage enclosure processor or a chassis processor.

Information handling system 600 may include additional processors that are configured to provide localized or specific control functions, such as a battery management controller. Bus 660 can include one or more buses, such as a Serial Peripheral Interface (SPI) bus, an Inter-Integrated Circuit (I2C) bus, a system management bus (SMBUS), a power management bus (PMBUS), or the like. BMC 680 may be configured to provide out-of-band access to devices at information handling system 600. Out-of-band access in the context of the bus 660 may refer to operations performed prior to execution of firmware 672 by processor 602 to initialize operation of the information handling system 600.

Firmware 672 may include instructions executable by processor 602 to initialize and test the hardware components of information handling system 600. For example, the instructions may cause the processor 602 to execute a power-on self-test (POST). The instructions may further cause the processor 602 to load a boot loader or an operating system (OS) from a mass storage device. Firmware 672 additionally may provide an abstraction layer for the hardware, such as a consistent way for application programs and operating systems to interact with the keyboard, display, and other input/output devices. When power is first applied to information handling system 600, the system may begin a sequence of initialization procedures, such as a boot procedure or a secure boot procedure. During the initialization sequence, also referred to as a boot sequence, components of information handling system 600 may be configured and enabled for operation and device drivers may be installed. Device drivers may provide an interface through which other components of information handling system 600 can communicate with a corresponding device. The firmware 672 may include a basic input-output system (BIOS) and/or include a unified extensible firmware interface (UEFI). Firmware 672 may also include one or more firmware modules of the information handling system 600. Additionally, configuration settings for the firmware 672 and firmware of the information handling system 600 may be stored in the NVRAM 670. NVRAM 670 may, for example, be a non-volatile firmware memory of the information handling system 600 and may store a firmware memory map namespace of the information handling system. NVRAM 670 may further store one or more container-specific firmware memory map namespaces for one or more containers concurrently executed by the information handling system.

Information handling system 600 may include additional components and additional buses, not shown for clarity. For example, information handling system 600 may include multiple processor cores (either within processor 602 or separately coupled to the chipset 606 or through the PCIe buses 608), audio devices (such as may be coupled to the chipset 606 through one of the PCIe buses 608), or the like. While a particular arrangement of bus technologies and interconnections is illustrated for the purpose of example, one of skill will appreciate that the techniques disclosed herein are applicable to other system architectures. Information handling system 600 may include multiple processors and/or redundant bus controllers. In some examples, one or more components may be integrated together in an integrated circuit (IC), which may include circuitry built on a common substrate. For example, portions of chipset 606 can be integrated within processor 602. Additional components of information handling system 600 may include one or more storage devices that may store machine-executable code, one or more communications ports for communicating with external devices, and various input and output (I/O) devices, such as a keyboard, a mouse, and a video display.

In some embodiments, processor 602 may include multiple processors, such as multiple processing cores for parallel processing by the information handling system 600. For example, the information handling system 600 may include a server comprising multiple processors for parallel processing. In some embodiments, the information handling system 600 may support virtual machine (VM) operation, with multiple virtualized instances of one or more operating systems executed in parallel by the information handling system 600. For example, resources, such as processors or processing cores of the information handling system may be assigned to multiple containerized instances of one or more operating systems of the information handling system 600 executed in parallel. A container may, for example, be a virtual machine executed by the information handling system 600 for execution of an instance of an operating system by the information handling system 600. Thus, for example, multiple users may remotely connect to the information handling system 600, such as in a cloud computing configuration, to utilize resources of the information handling system 600, such as memory, processors, and other hardware, firmware, and software capabilities of the information handling system 600. Parallel execution of multiple containers by the information handling system 600 may allow the information handling system 600 to execute tasks for multiple users in parallel secure virtual environments.

In some examples, the information handling system 600 may include or correspond to the one or more servers 102 of FIG. 1. For example, the processor 602 may correspond to the one or more processors 104, and the memory 604 may correspond to the memory 120. The processor 602 may execute the management application 106 and the payload template generator 110. In some other examples, the information handling system 600 may include or correspond to the client device 160 of FIG. 1. For example, the processor 602 may correspond to the one or more processors 162, and the memory 604 may correspond to the memory 168, and the display device 632 may correspond to the display 176. In some examples, the processor 602 may execute the HTML code 144 to present the payload generator 178 via the display device 632. Other examples are also within the scope of the disclosure.

Figure 7:
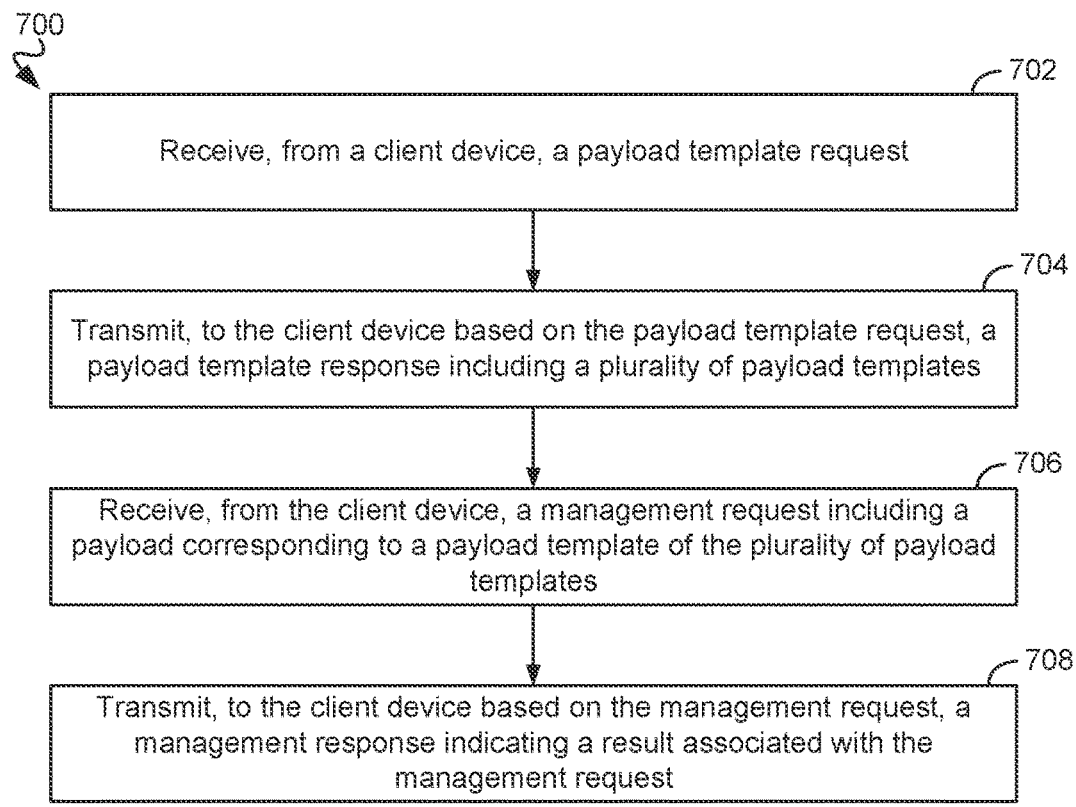
FIG. 7 is a flow chart of a method according to some aspects of the disclosure.

FIG. 7 is a flow chart of an example of a method 700 according to some aspects of the disclosure. In some examples, the method 700 may be performed by one or more devices described herein, such as by the one or more servers 102 of FIG. 1 or by the information handling system 600 of FIG. 6.

The method 700 includes receiving, from a client device, a payload template request, at 702. For example, the one or more servers 102 may receive the payload template request 130 from the client device 160.

The method 700 further includes transmitting, to the client device based on the payload template request, a payload template response including a plurality of payload templates, at 704. For example, the one or more servers 102 may transmit the payload template response 140 to the client device 160, and the payload template response 140 may indicate the payload templates 142.

The method 700 further includes receiving, from the client device, a management request including a payload corresponding to a payload template of the plurality of payload templates, at 706. For example, the one or more servers 102 may receive the management request 150 from the client device 160, and the management request 150 may include the payload 152 corresponding to a payload template of the payload templates 142.

The method 700 further includes transmitting, to the client device based on the management request, a management response indicating a result associated with the management request, at 708. For example, the one or more servers 102 may transmit the management response 156 to the client device 160, and the management response 156 may indicate the result 158 associated with the management request 150.

Figure 8:
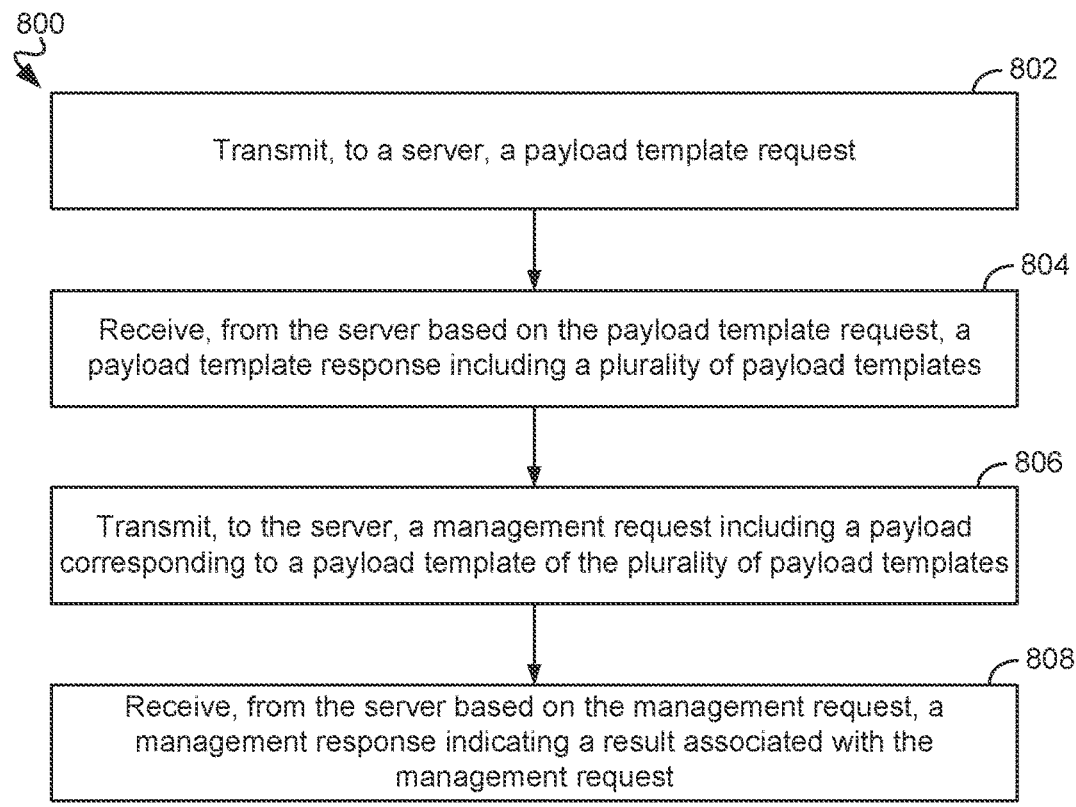
FIG. 8 is a flow chart of a method according to some aspects of the disclosure.

FIG. 8 is a flow chart of an example of a method 800 according to some aspects of the disclosure. In some examples, the method 800 may be performed by one or more devices described herein, such as by the client device 160 of FIG. 1 or by the information handling system 600 of FIG. 6.

The method 800 includes transmitting, to a server, a payload template request, at 802. For example, the client device 160 may transmit the payload template request 130 to the one or more servers 102.

The method 800 further includes receiving, from the server based on the payload template request, a payload template response including a plurality of payload templates, at 804. For example, the client device 160 may receive the payload template response 140 from the one or more servers 102, and the payload template response 140 may indicate the payload templates 142.

The method 800 further includes transmitting, to server, a management request including a payload corresponding to a payload template of the plurality of payload templates, at 806. For example, the client device 160 may transmit the management request 150 to the one or more servers, and the management request 150 may include the payload 152 corresponding to a payload template of the payload templates 142.

The method 800 further includes receiving, from the server based on the management request, a management response indicating a result associated with the management request, at 808. For example, the client device 160 may receive the management response 156 from the one or more servers 102, and the management response 156 may indicate the result 158 associated with the management request 150.

A diagram described herein (such as the ladder diagrams of FIGS. 2 and 3 and the flow chart diagrams of FIGS. 7 and 8) may be generally set forth as a logical flow chart diagram. As such, the depicted order and labeled steps may be indicative of aspects of the disclosed method. Other steps and methods may also be used to implement one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

One or more operations described herein may be described as being performed by a controller or processor. Such operations may be performed by any circuit configured to perform the operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus comprising:
a memory; and
one or more processors coupled to the memory, wherein the one or more processors are configured to:
based on receiving an invalid payload from a client device, transmit, to the client device, an indicator associated with a payload template generator;
receive, from the client device, a payload template request associated with the payload template generator;
transmit, to the client device based on the payload template request, a payload template response including a plurality of payload templates;
receive, from the client device, a management request including a payload corresponding to a payload template of the plurality of payload templates; and
transmit, to the client device based on the management request, a management response indicating a result associated with the management request.

2. The apparatus of claim 1, wherein the one or more processors are further configured to:
transmit a request to the payload template generator based on the payload template request; and
receive, based on the request, the plurality of payload templates from the payload template generator.

3. The apparatus of claim 1, wherein the one or more processors are further configured to:
receive, from the client device, a GET request associated with a target resource, the GET request including the invalid payload; and
transmit, to the client device based on the target resource, a response to the GET request indicating a uniform resource identifier (URI) of the payload template generator, wherein the indicator includes the URI.

4. The apparatus of claim 3, wherein the payload template request indicates the URI of the payload template generator.

5. The apparatus of claim 1, wherein the one or more processors are further configured to:
receive, from the client device, a request associated with a target resource, wherein the request includes the invalid payload, wherein the request corresponds to one of a PATCH request, a PUT request, or a POST request; and
based on the invalid payload, transmit, to the client device, an error response that includes a uniform resource identifier (URI) of the payload template generator, wherein the indicator includes the URI.

6. The apparatus of claim 5, wherein the payload template request indicates the URI of the payload template generator.

7. The apparatus of claim 1, wherein the payload template request indicates one or more parameters associated with a management operation indicated by the management request.

8. The apparatus of claim 1, wherein the one or more processors are further configured to execute a management application, and wherein the management request includes a representational state transfer (REST) application program interface (API) call to the management application.

9. A method comprising:
based on receiving an invalid payload from a client device, transmitting, to the client device, an indicator associated with a payload template generator;
receiving, from the client device, a payload template request associated with the payload template generator;
transmitting, to the client device based on the payload template request, a payload template response including a plurality of payload templates;
receiving, from the client device, a management request including a payload corresponding to a payload template of the plurality of payload templates; and
transmitting, to the client device based on the management request, a management response indicating a result associated with the management request.

10. The method of claim 9, wherein the payload template response includes code indicating the payload template generator to enable selection among the plurality of payload templates.

11. The method of claim 10, wherein the code further indicates a plurality of selectable properties for the payload that are to be selectable via the payload template generator, and wherein the management request is based on a selected property of the plurality of selectable properties.

12. The method of claim 11, wherein the code further indicates a description of the plurality of selectable properties that is to be indicated via the payload template generator.

13. The method of claim 10, wherein the code further indicates JavaScript Object Notation (JSON) text fields associated with the plurality of payload templates and that are to be indicated via the payload template generator.

14. The method of claim 10, wherein the code includes hypertext markup language (HTML) code executable by the client device to generate the payload template generator.

15. The method of claim 9, wherein the management request is for management of a target resource, and wherein the plurality of payload templates are selected based on one or more dynamically determined current properties associated with the target resource.

16. An information handling system, comprising:
a memory;
a processor coupled to the memory, wherein the processor is configured to:
based on transmitting an invalid payload to a server, receive, from the server, an indicator associated with a payload template generator;
transmit, to the server, a payload template request associated with the payload template generator;
receive, from the server based on the payload template request, a payload template response including a plurality of payload templates;
transmit, to the server, a management request including a payload corresponding to a payload template of the plurality of payload templates; and
receive, from the server based on the management request, a management response indicating a result associated with the management request.

17. The information handling system of claim 16, wherein the processor is further configured to:
transmit, to the server, a GET request associated with a target resource wherein the GET request includes the invalid payload; and
receive, from the server based on the target resource, a response to the GET request indicating a uniform resource identifier (URI) of the payload template generator, wherein the indicator includes the URI.

18. The information handling system of claim 17, wherein the payload template request indicates the URI of the payload template generator.

19. The information handling system of claim 16, wherein the processor is further configured to:
- transmit, to the server, a request associated with a target resource, wherein the request includes the invalid payload, wherein the request corresponds to one of a PATCH request, a PUT request, or a POST request; and
- based on the invalid payload, receive, from the server, an error response that includes a uniform resource identifier (URI) of the payload template generator, wherein the indicator includes the URI.

20. The information handling system of claim 19, wherein the payload template request indicates the URI of the payload template generator.

* * * * *